US012567617B2

(12) United States Patent
Kim et al.

(10) Patent No.: US 12,567,617 B2
(45) Date of Patent: Mar. 3, 2026

(54) METHOD OF MANUFACTURING SECONDARY BATTERY

(71) Applicant: SK On Co., Ltd., Seoul (KR)

(72) Inventors: Sung Yeop Kim, Daejeon (KR); Jin Go Kim, Daejeon (KR); Ji Won Na, Daejeon (KR); Eun Soo Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 36 days.

(21) Appl. No.: 17/719,694

(22) Filed: Apr. 13, 2022

(65) Prior Publication Data

US 2022/0328898 A1    Oct. 13, 2022

(30) Foreign Application Priority Data

Apr. 13, 2021    (KR) ........................ 10-2021-0047796

(51) Int. Cl.
| | |
|---|---|
| *H01M 10/647* | (2014.01) |
| *H01M 4/02* | (2006.01) |
| *H01M 4/38* | (2006.01) |
| *H01M 4/583* | (2010.01) |
| *H01M 10/44* | (2006.01) |
| *H01M 50/105* | (2021.01) |

(52) U.S. Cl.
CPC ....... *H01M 10/647* (2015.04); *H01M 10/446* (2013.01); *H01M 50/105* (2021.01); *H01M 2004/027* (2013.01); *H01M 4/386* (2013.01); *H01M 4/583* (2013.01)

(58) Field of Classification Search
None
See application file for complete search history.

(56) References Cited

U.S. PATENT DOCUMENTS

| | | | |
|---|---|---|---|
| 10,355,324 B2 | 7/2019 | Cherng et al. | |
| 2013/0328566 A1* | 12/2013 | Hojo ................... | H01M 10/446 |
| | | | 324/426 |
| 2016/0079579 A1* | 3/2016 | Jung ..................... | H01M 10/52 |
| | | | 29/623.2 |

(Continued)

FOREIGN PATENT DOCUMENTS

| | | |
|---|---|---|
| KR | 10-2010989 B1 | 8/2019 |
| KR | 10-2045246 B1 | 11/2019 |

(Continued)

OTHER PUBLICATIONS

WO-2018143733-A1—machine translation (Year: 2018).*

(Continued)

*Primary Examiner* — Haroon S. Sheikh

(74) *Attorney, Agent, or Firm* — IP & T GROUP LLP

(57) ABSTRACT

Proposed is a method of manufacturing a secondary battery. The method includes inserting an electrode assembly into a pouch, injecting an electrolyte into the pouch and aging, charging the electrode assembly, degassing to discharge gas from the pouch, discharging the electrode assembly, and charging to a shipment charge level. Since an anode active material is added to an anode material of a secondary battery through the method, there is an effect of further enhancing the reliability of the secondary battery in the manufacturing method of the secondary battery.

8 Claims, 3 Drawing Sheets

(56)                   References Cited

U.S. PATENT DOCUMENTS

| | | | | |
|---|---|---|---|---|
| 2016/0197376 A1* | 7/2016 | Koshiba | .............. | H01M 4/5825 |
| | | | | 429/188 |
| 2017/0179456 A1* | 6/2017 | Kim | .................... | H01M 50/426 |
| 2018/0047975 A1* | 2/2018 | Zhu | .................... | H01M 10/0525 |
| 2019/0267593 A1* | 8/2019 | Do | .......................... | H01M 4/04 |
| 2021/0181259 A1* | 6/2021 | Park | .................... | G01R 31/367 |
| 2021/0210802 A1* | 7/2021 | Cha | .................... | H01M 10/443 |
| 2022/0294024 A1* | 9/2022 | Choi | .................. | H01M 10/049 |
| 2023/0080890 A1* | 3/2023 | Lee | .................... | H01M 10/058 |
| | | | | 429/231.95 |

FOREIGN PATENT DOCUMENTS

| | | | | | |
|---|---|---|---|---|---|
| KR | 10-2020-0113762 A | 10/2020 | | | |
| KR | 10-2021-0034985 A | 3/2021 | | | |
| KR | 20210109896 A | * | 9/2021 | ........ | H01M 10/0525 |
| WO | WO-2018143733 A1 | * | 8/2018 | ............ | H01M 10/04 |

OTHER PUBLICATIONS

Battery University. BU-802c: How Low can a Battery be Discharged? Last updated Jul. 9, 2019. (Year: 2019).*
Office Action for Korean Patent Application No. 10-2021-0047796 issued by the Korean Patent Office on Sep. 22, 2025.

* cited by examiner

Inserting an electrode assembly into a pouch — S10

Injecting an electrolyte into the pouch and performing ageing — S20

Charging — S30

Degassing — S40

Discharging — S50

Charging to a shipment voltage — S60

METHOD OF MANUFACTURING SECONDARY BATTERY

CROSS REFERENCE TO RELATED APPLICATION

The present application claims priority to Korean Patent Application No. 10-2021-0047796, filed Apr. 13, 2021, the entire contents of which is incorporated herein for all purposes by this reference.

BACKGROUND OF THE INVENTION

1. Field of the Invention

An embodiment of the present disclosure relates to a method of manufacturing a secondary battery.

2. Description of the Related Art

Secondary batteries can be repeatedly used through charging that converts chemical energy into electrical energy and discharging which is the reverse process of the discharging. Secondary batteries are categorized into nickel-cadmium (Ni—Cd) batteries, nickel-hydrogen (Ni-MH) batteries, lithium-metal batteries, lithium-ion (Li-Ion) batteries, and lithium-ion polymer batteries (hereinafter referred to as "LIPB"), and the like.

A secondary battery is mainly composed of a cathode, an anode, an electrolyte, and a separator. The secondary battery performs charging and discharging using the voltage difference between a cathode and an anode made of different materials. Here, discharging is the movement of electrons from the high-voltage anode to the low-voltage cathode (electricity is generated as much as the voltage difference between the cathode and anode), and charging is the movement of electrons from the cathode to the anode. In this secondary battery, the cathode material receives electrons and lithium ions and converts back into the original metal oxide. That is, when the secondary battery is charged, a charging current flows as metal atoms move from the cathode to the anode through the separator. Conversely, when the secondary battery is discharged, a discharging current flows as the metal atoms move from the anode to the cathode.

In the process of manufacturing such a secondary battery, there were problems including deterioration in various specifications such as a yield decrease, physical deformation, and energy density of the secondary battery due to the characteristics of various active materials such as an anode active material and a cathode active material of the secondary battery.

RELATED ART LITERATURE

Patent Literature (Patent Literature 1) Korea Patent 10-2045246 B1

SUMMARY OF THE DISCLOSURE

An objective of the present disclosure is to provide a method of manufacturing a secondary battery to increase the reliability of a secondary battery manufacturing process and to increase the energy density of a secondary battery.

Another objective of the present disclosure is to provide a method of manufacturing a secondary battery, the method being capable of adjusting the specifications of secondary batteries and uniformizing the thickness of secondary batteries, thereby improving the precision and efficiency of assembling and application of secondary batteries.

According to one aspect of the present disclosure, a method of manufacturing a secondary battery includes: inserting an electrode assembly into a pouch; injecting an electrolyte into the pouch and performing ageing; charging an electrode assembly disposed in the pouch; degassing for discharging gas in the pouch; discharging the electrode assembly by a voltage charged through the charging; and charging the electrode assembly to a shipment voltage.

Here, the discharging may include a step of discharging to 2.5 V to 4.2 V or less.

The discharging may use a constant current (CC) method and a constant voltage (CV) method.

After the degassing, an additional charging process may not be performed before the discharging.

The electrode assembly may include an anode active material containing a graphite-based material, a silicon-based ($SiO_x$) material, or a combination thereof.

In addition, in the charging step, the secondary battery may be pressurized, and a temperature condition may be maintained in a range of 20° C. to 80° C. during the pressurization.

In addition, in the charging step, the charging current may range from 0.25 C-rate to 0.85 C-rate, and the secondary battery may be charged to a 20% to 50% charge level of a charge capacity of the secondary battery.

The features and advantages of the present disclosure will become more apparent from the following detailed description taken in conjunction with the accompanying drawings. The terms or words used in the present specification and claims should not be construed in a conventional and dictionary meaning, and that the inventor can appropriately define the concept of a term to describe his disclosure in the best way. Based on the principle, it should be interpreted as meaning and concept consistent with the technical idea of the present disclosure.

The secondary battery manufactured by the manufacturing method of the present disclosure may effectively reduce a thickness variation across the whole body of a secondary battery, thereby improving the space efficiency when assembling and applying the secondary battery in applications and improving the energy density of the secondary battery.

In addition, the present disclosure has an effect of further enhancing the reliability in the secondary battery manufacturing method.

In addition, since an additional charging step can be removed after the degassing and the discharging can be effectively performed, it is possible to effectively check the capacity of the secondary battery, thereby effectively sorting out secondary batteries having insufficient capacity.

DESCRIPTION OF THE PREFERRED EMBODIMENTS

The objectives, specific advantages, and novel features of the present disclosure will become more apparent from the following detailed description taken in conjunction with the accompanying drawings and preferred embodiments. In the present specification, in adding reference numbers to the components of each drawing, it should be noted that only the same components are given the same number as possible even though they are indicated on different drawings. In addition, terms such as "one side", "other side", "first", "second" are used to distinguish one component from another component, and the component is not that the component is not limited by the terms. In this specification, the term "secondary battery" is defined as encompassing not only the finally manufactured secondary battery but also general cells in the manufacturing process. Hereinafter, in describing the present disclosure, detailed descriptions of related known technologies that may unnecessarily obscure the gist of the present disclosure will be omitted.

Hereinafter, embodiments of the present disclosure will be described in detail with reference to the accompanying drawings.

Figure 1:
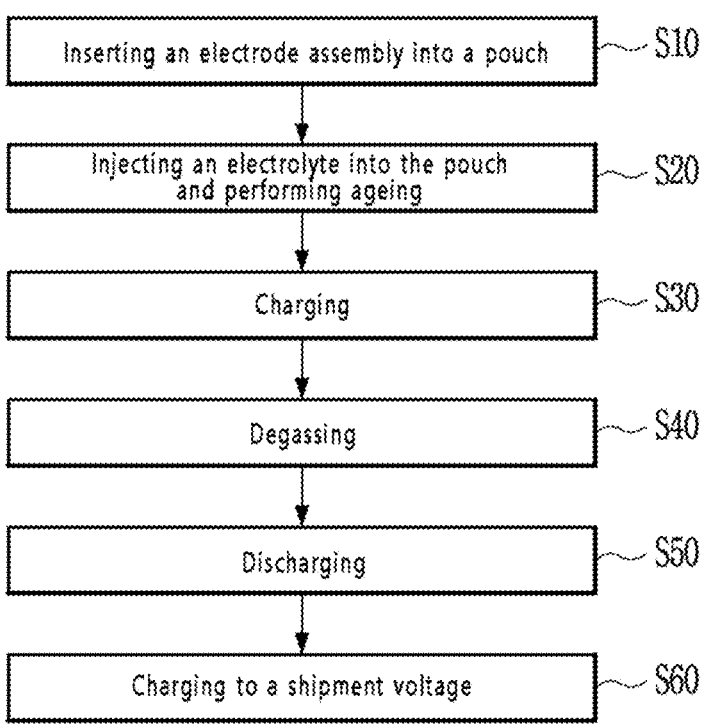
FIG. 1 is a flowchart of a secondary battery manufacturing method according to an embodiment of the present disclosure.
Figure 2:
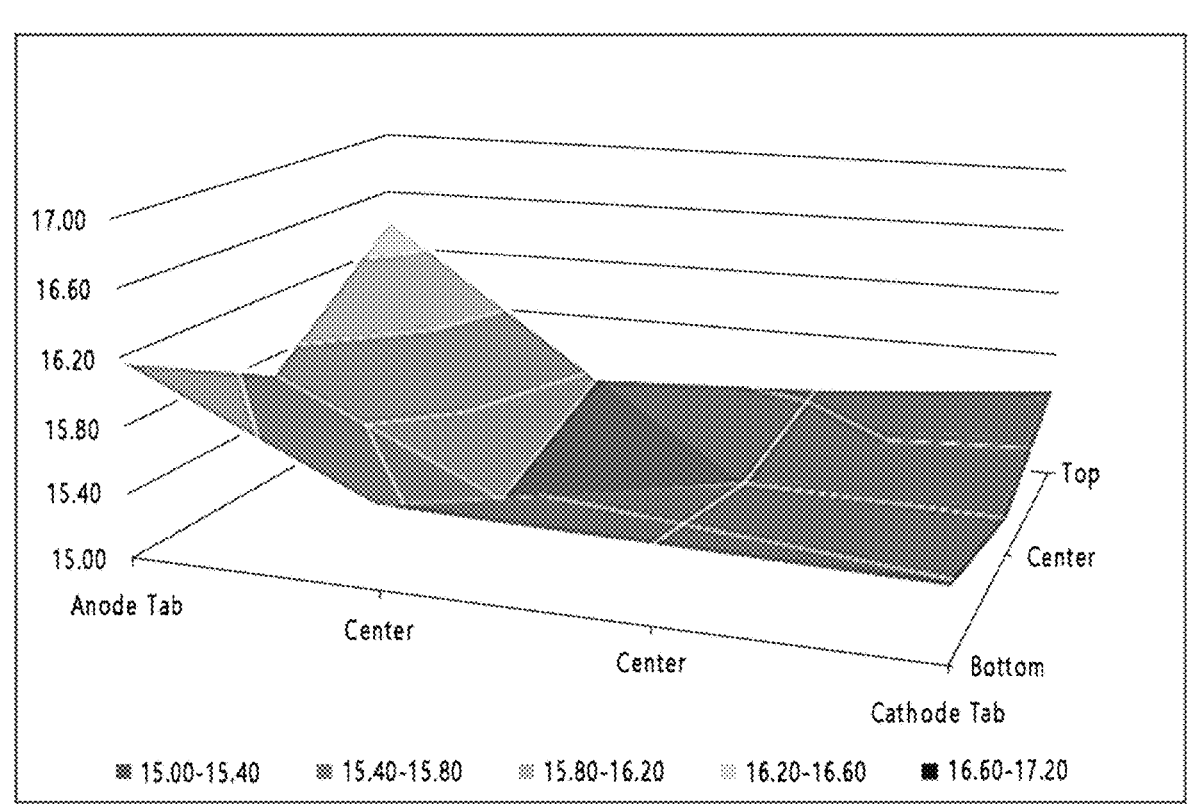
FIG. 2 is a graph illustrating a thickness distribution throughout a secondary battery manufactured through a secondary battery manufacturing method according to a comparative example.
Figure 3:
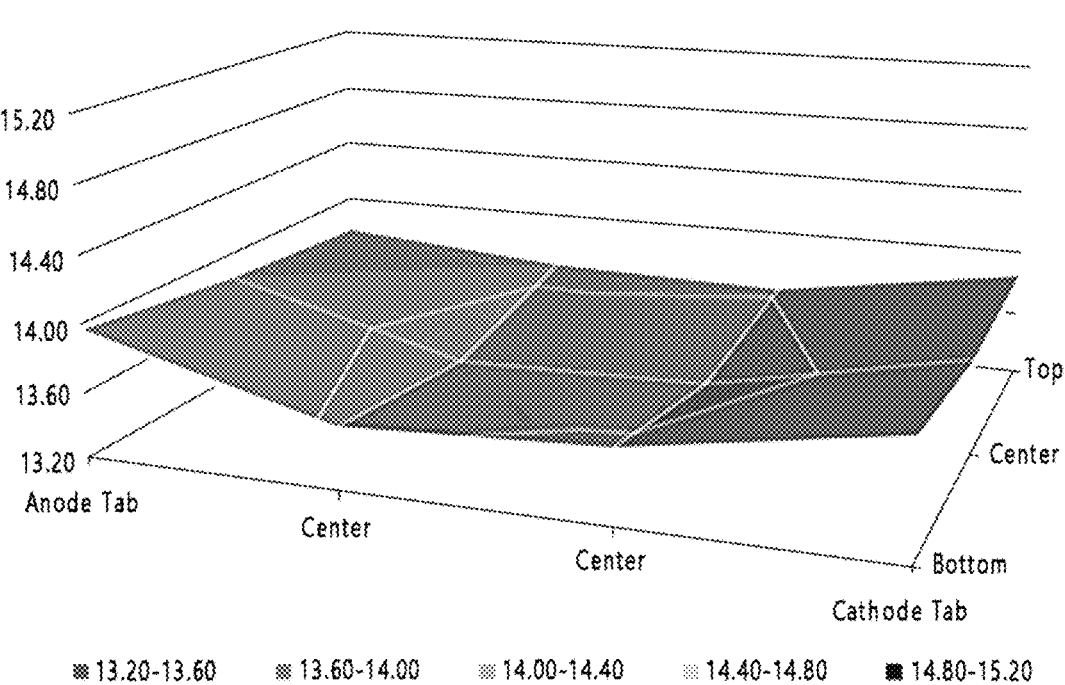
FIG. 3 is a graph illustrating a thickness distribution of a secondary battery manufactured through a secondary battery manufacturing method according to an embodiment of the present disclosure.

FIG. 1 is a flowchart of a secondary battery manufacturing method according to an embodiment of the present disclosure, FIG. 2 is a graph illustrating a thickness distribution of a secondary battery according to a secondary battery manufacturing method according to a comparative example, and FIG. 3 is a graph illustrating a thickness distribution of a secondary battery according to the secondary battery manufacturing method according to an embodiment of the present disclosure.

According to an embodiment of the present disclosure, a method of manufacturing a secondary battery includes: inserting an electrode assembly into a pouch; injecting an electrolyte into the pouch and performing aging; charging an electrode assembly; degassing for discharging gas in the pouch; discharging the electrode assembly; and charging the electrode assembly to a shipment voltage.

A method of manufacturing a secondary battery according to an embodiment of the present disclosure is to prevent a serious problem of manufacturing a secondary battery due to distortion or deformation of a cell during a charging/discharging process after a degassing step according to the characteristics of the anode active material in the secondary battery manufacturing process.

For example, the lithium secondary battery anode serves to allow current to flow through an external circuit while storing and releasing lithium ions from the cathode.

In this case, since the supplement and addition of the anode active material has various effects on the secondary battery's output power, lifespan, or capacity, the anode active material is essential for manufacturing optimized specifications of the secondary battery.

However, the supplement and addition of such an anode active material caused various problems in the manufacturing process of the conventional secondary battery. That is, in the conventional manufacturing process of the secondary battery, volume expansion occurs excessively during the charging or discharging process of the secondary battery, or deformation such as distortion of the secondary battery occurs. In particular, in the case of a silicon-based anode active material, due to its inherent properties, the volume expansion of the secondary battery is excessively generated during the charging process, thereby causing a problem such as distortion of the secondary battery.

Such deformation of the secondary battery causes structural problems in the final assembly of secondary batteries or device application and greatly affects the energy density of the secondary battery itself, thereby being directly related to the performance of the secondary battery.

According to an embodiment of the present disclosure, an anode active material includes a graphite-based material, a silicon-based ($SiO_x$) material, or a combination thereof, and there is no particular limitation on known anode active materials. However, it is obvious that if the occurrence of a problem in the secondary battery manufacturing process is ultimately due to the controllable and controllable properties of the material, it may be included in the scope of the present disclosure.

Specifically, in the method of manufacturing a secondary battery according to an embodiment of the present disclosure, as shown in FIG. 1, a first stage (S10) is inserting an electrode assembly into a pouch.

Although an embodiment of the present disclosure describes an example of manufacturing a pouch-type secondary battery, the method of manufacturing a secondary battery according to an embodiment of the present disclosure for solving various problems caused by an anode active material may be applied to various cases.

After inserting the electrode assembly into the pouch, an electrolyte is injected into the pouch. After inserting the electrode assembly into the pouch, a certain area is sealed. After sealing, an electrolyte is injected, the final remaining part is sealed, and an aging step for impregnation of the electrolyte is performed (S20).

Next, an initial charging step (S30) is performed in order to discharge the gas that may be generated in the manufacturing process inside the pouch to the outside.

This charging step may be performed under pressurization and required temperature conditions for a secondary battery.

The required temperature conditions are maintained in the range of 20° C. to 80° C. Charging is performed with a charging current of 0.25 C-rate to 0.85 C-rate.

Here, 1 C-rate is defined as a capacity that can be charged for 1 hour.

The charging step is continued until the charging current flows in this way and reaches 20% to 50% capacity of the entire secondary battery.

The following is a degassing step of the charged secondary battery, that is, a step of discharging the gas(S40) generated through charging inside the pouch to the outside. In general, a separate pouch space for discharging the gas is formed in the degassing step, and after the degassing step, a pouch part formed for discharging the gas is cut.

In this way, after the degassing step of discharging the gas inside the pouch, a discharging step (S50) is performed. When charging and discharging are simultaneously performed after the previous degassing step as in the past, there was a problem in that the efficiency of the energy density of the entire secondary battery is greatly decreased as well as the structural imbalance of the secondary battery due to physical deformation of the secondary battery due to the anode active material contained in the secondary battery during the charging stage.

In order to solve this problem, in the method of manufacturing a secondary battery according to an embodiment of the present disclosure, it is designed to delete the conventional charging step after the degassing step and to check the capacity and the capacity defect of the secondary battery through an independent discharging step. In addition, this discharging step may effectively prevent an imbalance in the thickness of the secondary battery to be manufactured and effectively prevent heat generation or overheating of the secondary battery in the manufacturing process.

Specifically, in the discharging step of this embodiment, discharging is performed at a voltage of 2.5 V to 4.2 V or less. In this discharging step, by performing the step of discharging from the charged capacity in the charging step before the degassing step, it is possible to effectively check the capacity of the secondary battery and select the capacity defect.

The discharging step of this embodiment uses a constant current and constant voltage (CC/CV) method.

First, the constant current method allows a constant current rate to flow to the closed circuit regardless of the time when controlling charging and discharging through an external power supply. Since the constant current method is at a constant rate, there is an advantage in that the amount of charge and discharge can be easily identified by knowing the time.

The constant voltage method applies a constant voltage to the closed circuit regardless of the time when controlling charging and discharging through an external power supply. In this case, since the amount of current changes with time, in order to know the charge/discharge capacity, it is required to check the current change over time and integrate the area.

Lastly, according to an embodiment of the present disclosure, the CC/CV method applied in the discharging step of the secondary battery manufacturing method is to control 2.5° C., the standard deviation of the discharge capacity was 0.22 Ah, and the accuracy of capacity prediction was 97%.

Comparative process 1 is a case in which both the charging and discharging steps after the degassing step are performed in the manufacturing process of the secondary battery in which the anode active material contains a silicon-based ($SiO_x$) material.

In the case of Comparative process 1, when discharging through the discharging step, the temperature increase amount (temperature after discharging—temperature before discharging) of the secondary battery was 4.4° C., and the standard deviation of the discharging capacity was measured to be 0.51 Ah.

Comparative process 2 is a case in which only the CC-type discharging step is performed without the charging step after the degassing step in the manufacturing process of the secondary battery in which the anode active material contains a silicon-based ($SiO_x$) material.

In the case of Comparative process 2, when discharging through the discharge stage, the temperature increase amount of the secondary battery (temperature after discharge—temperature before discharge) was 4.1° C., a standard deviation of discharge capacity was 0.41 Ah, and the accuracy of capacity prediction was measured to be 95%.

A comparison of the Example process and the Comparative process for Example 1 above is as follows.

TABLE 1

| | [Comparative process 1] After degassing, when charging and discharging are all performed(Charging->discharging) | [Comparative process 2] After degassing, when discharging is performed in CC(constant current) method | [Example process] After degassing, when discharging is performed in CC/CV(constant current/ constant voltage) method |
|---|---|---|---|
| Secondary battery temperature increase when discharging (temperature after discharging – temperature before discharging) | 4.4° C. | 4.1° C. | 2.5° C. |
| Standard deviation of discharge capacity | 0.51 Ah | 0.41 Ah | 0.22 Ah |
| Accuracy of capacity prediction | — | 95% | 97% | under a constant current condition up to a specific cell voltage and then to control discharging in a constant voltage method thereafter.

In this way, by applying the constant current and constant voltage (CC/CV) method in the discharging step, heat generation of the secondary battery due to discharging can be reduced. This reduction of heat generation in the secondary battery has the effect of significantly reducing the overall capacity deviation of the secondary battery. By reducing the capacity deviation of the secondary battery in this way, the accuracy of the regression equation for predicting the discharge capacity in the conventional secondary battery manufacturing method may be more effectively improved.

Example 1

The embodiment of the Example process is a case in which only the CC/CV method discharge step is performed without the charging step after the degassing step in the manufacturing process of the secondary battery in which the anode active material contains a silicon-based ($SiO_x$) material.

In the case of the embodiment of the Example process, when discharging through the discharging step, the temperature increase amount (temperature after discharging—temperature before discharging) of the secondary battery was As shown in Table 1, in the method of manufacturing a secondary battery according to an embodiment of the present disclosure, a comparison with Comparative process 1 in which both charging and discharging steps are performed after degassing, and Comparative process 2 in which discharging steps are performed in a constant current method after degassing were prepared. In the embodiment of Example process, it may be seen that the deviation of the temperature before and after discharge is significantly reduced, and the standard deviation of the discharge capacity is also significantly low. In addition, it may be confirmed that the Example process has a very high probability of 97% of the accuracy of predicting the capacity of the secondary battery through the discharging step.

Next, after performing this discharging step, a secondary battery is manufactured through a final charging step which the secondary battery (S60) charges to the shipment voltage level. Here, the shipment voltage level is not determined as a specific voltage but may be designed to have various values according to applied devices and specifications.

In the case of manufacturing a finally manufactured secondary battery, here, a secondary battery in which an anode active material containing a silicon-based ($SiO_x$) material as in Table 1 above, the technical effect of the Example process may be confirmed through the comparison of the Comparative process and the Example process and the experimental result of the energy density change value of the secondary battery.

In addition, by comparing FIG. 2, which is a graph related to the thickness data of the secondary battery according to the Comparative process 1, and FIG. 3, which is a graph related to the thickness data of the secondary battery through the Example process of the present disclosure, this difference can be confirmed more clearly.

First, FIG. 2 is a graph showing the overall thickness distribution of a final secondary battery manufactured by a general secondary battery manufacturing method.

As a result of the Comparative example shown in FIG. 2, it may be seen that the anode tab region has a significantly greater thickness variation than the cathode tab region. According to FIG. 2, the deviation of the thickness is 1.58 mm, and specifically, the deviation in the range of 1.4 mm to 1.7 mm appears in the equivalent embodiment.

On the other hand, in the case of the secondary battery, according to the embodiment of the present disclosure shown in FIG. 3, there is little difference in thickness between the anode tab area and the cathode tab area. In contrast to the result of FIG. 2, it can be seen that the overall thickness variation of the secondary battery is significantly reduced. That is, as shown in FIG. 3, the thickness deviation of the secondary battery according to an embodiment of the present disclosure is 0.52 mm, and specifically, in various equivalent embodiments, it can be confirmed that the thickness deviation is in the range of 0.45 mm to 0.55 mm.

That is, it can be seen that the flatness of the secondary battery is improved from 1.58 mm to 0.52 mm by checking the numerical values shown in the graphs of FIGS. 2 and 3 above.

The correlation between the energy density of the secondary battery according to the reduction in the thickness variation of the secondary battery as described above can be confirmed through Example 2 below.

Example 2

This is an experiment on the change in energy density of the secondary battery finally manufactured according to the manufacturing process of the secondary battery in which the anode active material contains a silicon-based ($SiO_x$) material according to an embodiment of the present disclosure.

In this experiment, in each case where the design energy density of the initial secondary battery was 750 Wh/L and 720 Wh/L, the change and difference in energy density of the secondary battery finally manufactured according to the Comparative process, and the Example process was measured. Here, the Comparative process is a method of manufacturing a secondary battery, including a charging step after degassing.

Comparative Experiment 1

First, it is a case where the design energy density of the initial secondary battery is 750 Wh/L.

When the secondary battery was manufactured by the Comparative process, the energy density of the finally manufactured secondary battery was measured to be 741 Wh/L, and thus, a secondary battery with an energy density lower than the designed energy density of the initial secondary battery is manufactured.

In this case, the final energy density of the secondary battery manufactured by the manufacturing method of the secondary battery, which is the Example process according to an embodiment of the present disclosure, is measured to be 758 Wh/L, which is more improved than the design energy density of the initial secondary battery and the energy density of the secondary battery manufactured by the Comparison process.

Comparative Experiment 2

First, it is a case where the design energy density of the initial secondary battery is 720 Wh/L.

When the secondary battery was manufactured by the Comparative process, the energy density of the finally manufactured secondary battery was measured to be 716 Wh/L, and thus, a secondary battery with an energy density lower than the designed energy density of the initial secondary battery is manufactured.

In this case, the final energy density of the secondary battery manufactured by the manufacturing method of the secondary battery, which is the Example process according to an embodiment of the present disclosure, is measured to be 730 Wh/L, which is more improved than the design energy density of the initial secondary battery and the energy density of the secondary battery manufactured by the Comparison process.

Experimental results based on Comparative experiments 1 and 2 of Example 2 above can be summarized in Table 2 below.

TABLE 2

| | Initially designed energy density | Energy density of secondary battery by comparative process | Energy density of a secondary battery according to an embodiment of the present disclosure |
|---|---|---|---|
| Comparative experiment 1 | 750 Wh/L | 741 Wh/L(reduced) | 758 Wh/L(increased) |
| Comparative experiment 2 | 720 Wh/L | 716 Wh/L(reduced) | 730 Wh/L(increased) |

As shown in Table 2, in Comparative experiment 1, the energy density of the secondary battery according to the embodiment of the present disclosure is increased by about 2.3% compared to the energy density of the secondary battery according to the Comparative process.

Also in Comparative experiment 2, it can be seen that the secondary battery according to the embodiment of the present disclosure has a measured value of energy density that is increased by about 2.0% compared to the energy density of the secondary battery according to the Comparative process.

That is, as shown in FIGS. 2 and 3, through the secondary battery manufacturing method according to the embodiment of the present disclosure, the physical deformation of the overall thickness deviation of the secondary battery may be effectively alleviated. In addition, it can be seen that the energy density of the secondary battery is also improved.

Although the present disclosure has been described in detail through specific examples, this is for the purpose of describing the present disclosure in detail, and the present disclosure is not limited thereto. It is clear that the modification or improvement is possible by those of ordinary skilled in the art within the technical spirit of the present disclosure.

All simple modifications or changes of the present disclosure fall within the scope of the present disclosure, and the specific protection scope of the present disclosure will be made clear by the appended claims.

What is claimed is:

1. A method of manufacturing a secondary battery, the method comprising:

inserting an electrode assembly into a pouch;

injecting an electrolyte into the pouch and performing aging;

initially charging the electrode assembly to discharge the gas generated in the manufacturing process inside the pouch to outside the pouch;

immediately after the initially charging, degassing to discharge gas generated by the initially charging inside the pouch to the outside;

after the degassing, discharging the electrode assembly by performing the discharging from the charged capacity of the initially charging; and charging the electrode assembly to a shipment charge level, wherein the electrode assembly comprises a negative electrode that includes a silicon-based active material selected from $SiO_x$ and mixtures thereof, the negative electrode being substantially lithium-free prior to the initial charging.

2. The method of claim 1, wherein the discharging step comprises a process of discharging the electrode assembly to 2.5 V to 4.2 V or less.

3. The method of claim 1, wherein the discharging step uses a constant current and constant voltage (cc/cv) method.

4. The method of claim 1, wherein the electrode assembly comprises an anode active material comprising a graphite-based material, a silicon-based ($SiO_x$) material, or a combination thereof.

5. The method of claim 1, wherein in the initial charging, the secondary battery is pressurized, and a temperature is maintained in a range of 20° C. to 80° C. during the pressurization.

6. The method of claim 1, wherein in the initial charging, charging is performed at a charging current of 0.25 C-rate to 0.85 C-rate until charging reaches the charge capacity of 20% to 50% level of the secondary battery.

7. The method of claim 1, wherein a thickness deviation between an anode tab area and a cathode tab area of the electrode assembly, charged at the shipment charge level, is 0.45 mm to 0.55 mm.

8. The method of claim 1, wherein no additional charging occurs between the degassing and the discharging the electrode assembly.

* * * * *